Aug. 28, 1945.   W. L. BOND   2,383,764
APPARATUS FOR X-RAY ANALYSIS
Filed Sept. 10, 1943   4 Sheets-Sheet 1

INVENTOR
W.L. BOND
BY E. V. Griggs
ATTORNEY

Aug. 28, 1945.   W. L. BOND   2,383,764
APPARATUS FOR X-RAY ANALYSIS
Filed Sept. 10, 1943   4 Sheets-Sheet 3

INVENTOR
W. L. BOND
BY
*E. V. Griggs*
ATTORNEY

Aug. 28, 1945.  W. L. BOND  2,383,764
APPARATUS FOR X-RAY ANALYSIS
Filed Sept. 10, 1943  4 Sheets-Sheet 4

INVENTOR
W.L. BOND
BY
ATTORNEY

Patented Aug. 28, 1945

2,383,764

UNITED STATES PATENT OFFICE 2,383,764

APPARATUS FOR X-RAY ANALYSIS

Walter L. Bond, Summit, N. J., assignor to Bell Telephone Laboratories, Incorporated, New York, N. Y., a corporation of New York Application September 10, 1943, Serial No. 501,747

16 Claims. (Cl. 250—83.6)

This invention relates to X-ray analysis apparatus and more particularly to an X-ray goniometer for use in the examination of quartz piezoelectric crystal plates.

An object of the invention is to improve and facilitate the production of quartz piezoelectric crystal plates.

Another object of the invention is to simplify the adjustments of an X-ray goniometer for various predetermined tests whereby the tests may be made accurately and rapidly by relatively unskilled workers and may be exactly duplicated when desired.

A still further object of the invention is to facilitate and simplify checking the orientation of a crystal plate in a number of different predetermined ways.

In connection with the preparation of quartz piezoelectric plates it is the practice of some manufacturers to examine the raw, mother crystal and the plates cut therefrom by means of X-rays at various stages in the manufacture. For example there is disclosed in Patent 2,151,736, issued March 28, 1939, to W. W. Broughton, a testing procedure in accordance with which quartz crystals are examined by means of X-rays. It is well known, of course, that when X-rays reflect from a crystal, they reflect not from the apparent surface of the crystal but from atomic planes thereof. The reflecting properties of many of the atomic planes of quartz have been investigated and tabulated.

It is now common practice to produce quartz piezoelectric plates by cutting the blank from the raw or mother crystal at various predetermined orientations with respect to one or more of the crystallographic axes of the mother crystal. For example, as described in detail in Patent 2,268,365, issued December 30, 1941, to G. W. Willard, one such plate, commonly referred to as the CT cut, is produced by cutting the plate from the mother crystal so orientated that the two major surfaces of the plate are inclined +38 degrees with respect to the Z, or optic, axis and are parallel to an X, or electric, axis. A second plate, commonly referred to as the AT cut and described in Patent 2,218,200 issued October 15, 1940, to F. R. Lack et al., is produced in the same manner except that the inclination with respect to the Z axis is +35 degrees and 15 minutes while still a third plate, known as the BT cut and described in Patent 2,218,225 issued October 15, 1940, to G. W. Willard, is produced in the same manner but with an inclination of —49 degrees with respect to the Z axis.

It will be apparent from the above that, in a crystal shop where the output of the various types of plates is relatively large, many crystal plates must be checked for orientation in various ways during a working period that are similar with respect to orientation and yet must not be of exactly the same orientation. For example, if AT plates and BT plates are being produced, it will be necessary to check the AT plates for the desired rotation of +35 degrees 15 minutes about an X axis with respect to the Z axis, to check the BT plates for the similar (and desired), rotation of —49 degrees and to check both types of plates against other rotations that would be undesirable, for example, rotation about their edges perpendicular to the X axis. It is also necessary to guard against accepting a cut having the opposite orientation to that desired, for example, a +49 cut should not be accepted as a BT.

In order to check the plates by the X-ray method with respect to the above points as well as other points which it is desirable to be able to check, it will be obvious that the X-rays must be projected to the plate at different angles for the different tests and that the ionization chamber, or other means utilized for picking up and measuring the reflected X-rays, must also be set at different angular positions for each test.

For example, the AT plate referred to above (35 degrees 15 minutes) can be checked from the atomic plane designated (01·$\bar{1}$), the angle of which is 38 degrees 13 minutes with respect to the Z axis of the crystal. (The designation of atomic planes by the indices thereof, as followed above, is in accordance with the so-called Bravais extension of the Miller indices system; this method is well known to those skilled in the crystal art and as the method of designation per se has no particular relationship to the present invention it will not be explained further. It might be pointed out, however, that the negative sign (—) occurring over one of the digits of a designation indicates that the plane is the "mirror image" of a plane designated by the same digits without a negative sign, i. e., the planes are oppositely inclined with respect to the Z axis. For example, planes designated (05·2) and (05·$\bar{2}$), respectively, are mirror image planes with respect to each other.) If the plate being checked is a perfect AT cut therefore it should be indicated to the observer that the plate is "off" from the (01·$\bar{1}$) plane by 2 degrees 58 minutes (in the right direction), i. e., 38 degrees 13 minutes minus 35 degrees 15 minutes, but, in order to simplify the use of the instrument particularly when measuring "error," i. e., departure from a perfect cut, the dials preferably should indicate "35 degrees 15 minutes" and not "2 degrees 58 minutes." The (01·1̄) plane has an X-ray reflection angle of 13 degrees 20 minutes for copper Kα radiation (i. e., X-ray radiation from a copper target tube) so that the ionization chamber must be set at an inclination of two times 13 degrees 20 minutes from the position in which it would be in line with the slit system. The plate must have its face inclined at an angle of 13 degrees 20 minutes ±2 degrees 58 minutes to the incident X-ray beam and the dial scale must be so arranged that when all of the above conditions are met the reading is "35 degrees and 15 minutes" for the plus inclination of the plate or "41 degrees and 11 minutes" for the minus inclination of the plate.

It can readily be seen from the above that for each different type of plate and for different tests on the same type of plate, a carefully predetermined relative adjustment of the plate, ionization chamber, slit box and dial is required and that each separate test involves a completely new X-ray investigation which, without the novel arrangement of the present invention, would require the services of a skilled X-ray technician to prepare for and carry out.

A feature of the present invention is means whereby the proper relative adjustments of the crystal plate, ionization chamber, slit box and dial for various tests may simply and accurately achieved by a relatively inexperienced observer.

In accordance with a specific embodiment of the present invention X-ray analysis apparatus is provided which includes a goniometer assembly comprising a slit box, an ionization chamber, a crystal plate holder and a supporting base-plate. A shaft is supported by, and extends vertically from, the base-plate and three discs are stacked vertically and concentrically on the shaft being rotatable with respect to the base and with respect to each other. The lower of the three discs carries a dial arrangement for measuring and indicating small angles, the middle disc supports the ionization chamber and the top disc is provided with a scale, graduated in intervals of 5 degrees and numerated in tens of degrees, along a portion of its periphery. The crystal plate holder is rotatably supported by the upper portion of the shaft while the slit box is supported by a vertical shaft supported by the base-plate. The relative heights of the slit box, the crystal plate holder and the ionization chamber are properly established with respect to each other and with respect to the X-ray source for reception and reflection of the X-ray beam.

The upper disc is provided with a number of spaced holes each of which may be identified by an explanatory designation. Each of the other discs and the base-plate are provided with the same number of holes as the upper disc; the spacing of the holes is different for each disc and for the base-plate. The spacing of the holes in each of the discs and in the base-plate is carefully worked out and established during the design of the apparatus in accordance with the types of plates that are to be tested and the nature of the tests to be performed hereon. When it is desired to perform a selected one of the predetermined tests the proper hole in the upper disc for the particular test, as indicated by the explanatory designation, is selected and a tapered pin inserted therein. The discs are then rotated with respect to each other and with the base-plate until the pin has dropped through registering holes in the other two discs and in the base-plate thereby locking the discs and the base in a particular angular relationship. This means, of course, that the ionization chamber supported by the middle disc, the slit box supported by the base-plate and the dial carried by the lower disc are all locked in a definite predetermined angular relationship; the position of the crystal plate holder is also determined, in the first instance, by this relative rotation of the discs but may be further adjusted by rotation of the holder in either direction within relatively narrow limits, independently of rotation of the discs. The spacing of the holes in the discs is such that, for any selected hole in the upper disc, only one hole in the group of holes in the middle disc, lower disc and base-plate, respectively, will be found to register therewith.

A complete understanding of the design and operation of the arrangement contemplated by the present invention and appreciation of the various features thereof will be gained from consideration of the following detailed description and the annexed drawings in which.

Figure 1:
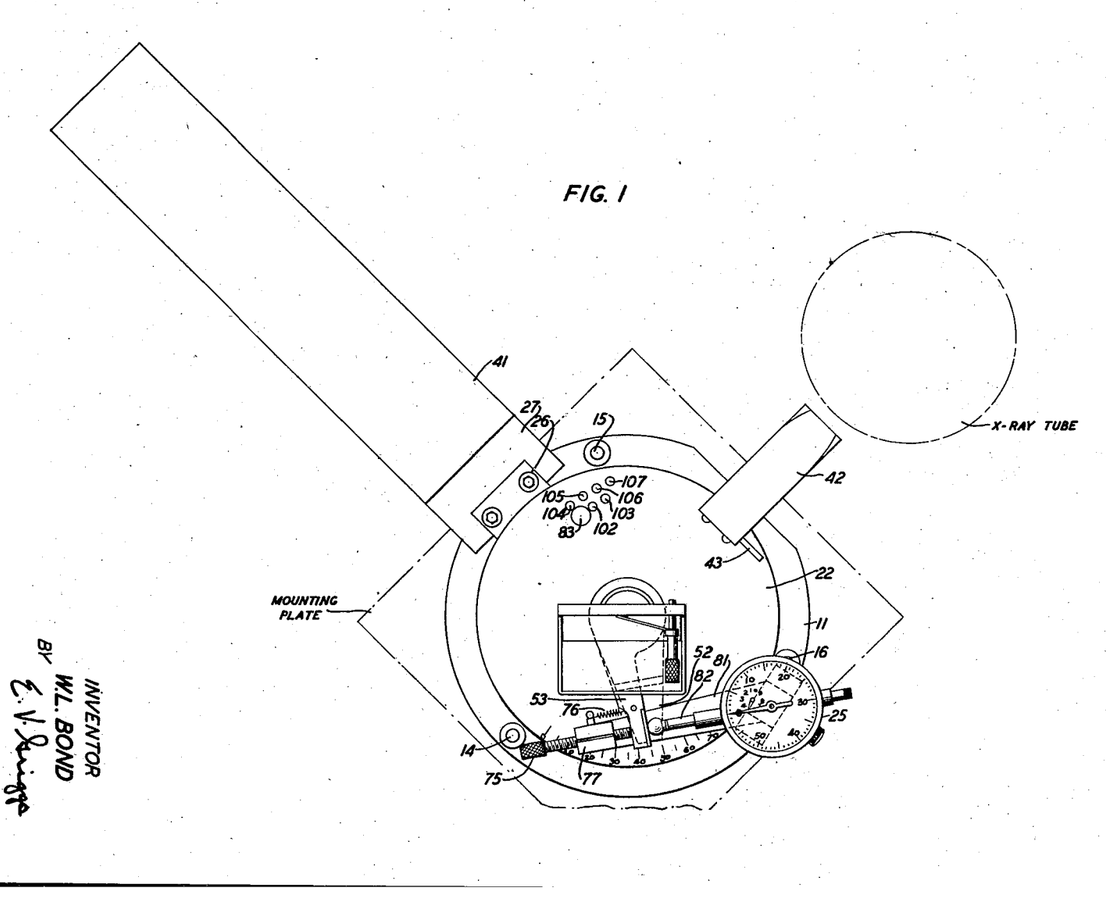
Fig. 1 is a plan view of X-ray analysis apparatus embodying features of the present invention, the position of the X-ray tube being indicated by dotted lines.
Figure 2:
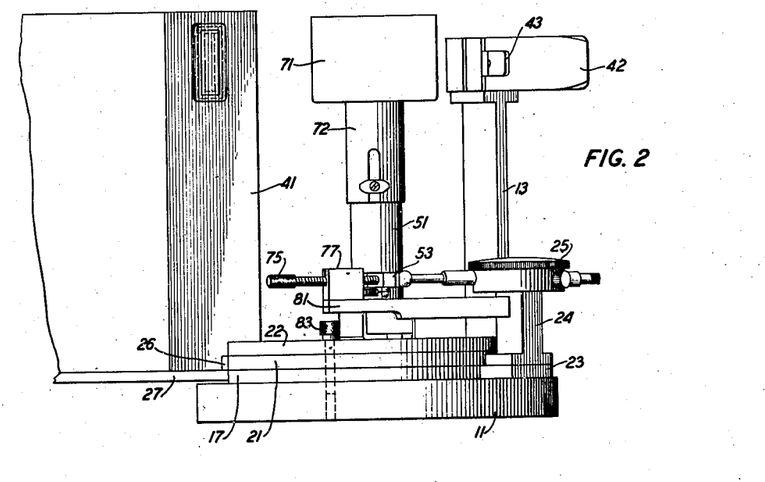
Fig. 2 is a front elevation of the goniometer assembly shown in Fig. 1; the ionization chamber supporting arm and the ionization chamber supported thereby being broken away.
Figure 3:
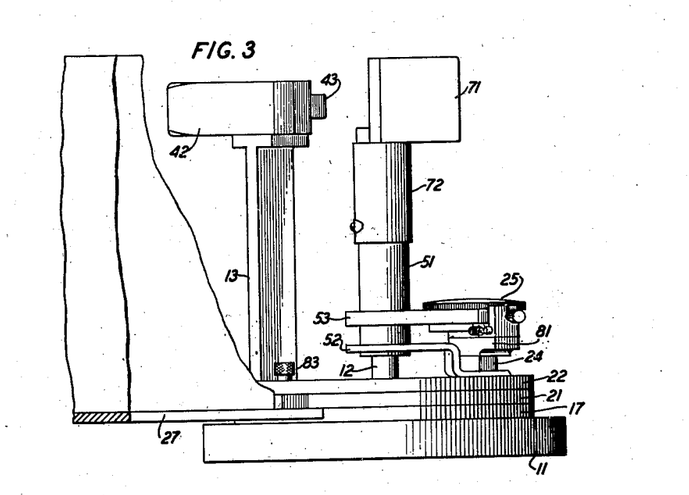
Fig. 3 is a side elevation of the goniometer assembly of Fig. 2.

Referring now to the drawings, the X-ray goniometer assembly shown in Figs. 1, 2 and 3, includes a base-plate 11 from which extend vertical shaft 12 and vertical bar 13. Base-plate 11 is provided with suitable holes about its periphery in which bolts 14, 15 and 16 may be positioned for attaching the base-plate to a suitable mounting plate which may, for example, be of the general outline indicated by dotted lines in Fig. 1. An X-ray tube of suitable type and supported by suitable means may be provided as indicated by the dotted lines.

Three discs, 17, 21 and 22, are stacked concentrically on shaft 12, the lower disc 17 being in contact with the upper surface of base-plate 11. The three discs are rotatable with respect to base-plate 11 and shaft 12 and with respect to each other.

Figure 5:
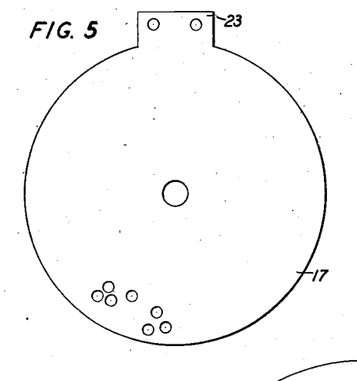
Fig. 5 is a similar view of the lower disc of the assembly.
Figure 6:
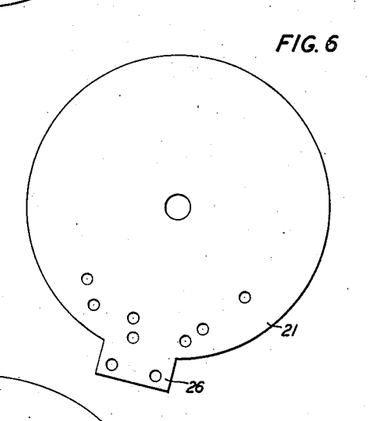
Fig. 6 is a similar view of the middle disc of the assembly.
Figure 7:
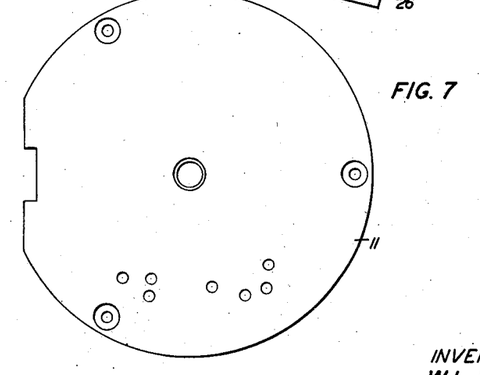
Fig. 7 is a similar view of the base-plate.

The lower disc 17 is provided with projection 23 (Fig. 5) upon which is mounted vertical bar 24; bar 24, in turn, supports dial gauge 25, which indicates degrees and minutes. A similar projection 26 (Fig. 6) is provided on middle disc 21 to which is attached arm 27; arm 27, in turn, supports ionization chamber 41. The upper disc 22 (Fig. 4) is provided with a scale, numerated in tens of degrees, along a portion of the periphery. Seven holes are provided in disc 22 being located near the periphery of the disc and opposite to the scale. The purpose of these holes and of the similar number of differently spaced holes provided in discs 17 and 21 and in base-plate 11 will be described in detail subsequently.

Slit box 42 is supported by vertical bar 13 at the proper height to be interposed in the beam of X-rays projected from the X-ray tube to the crystal plate holder. Slit box 42 may be in the form of a rectangular metal block having a centrally located horizontal bore therein. A metal plate may be attached to each end of the block, each of which plates has a narrow vertical slit therein which registers with the respective end of the horizontal bore. The slit in the rear of the box is normally left open but the slit in the front of the box is normally closed by a metal shutter, which is biased by a suitable spring to a position closing the slit, but which may be moved upon occasion by lever 43 to a position wherein the slit is unobstructed. When both slits are open, slit box 42 will pass X-rays which, due to the action of the two slits, will be in the form of a narrow beam, i. e., the slit box acts as a collimator of the X-rays. When the front slit is closed by the metal shutter, however, no X-rays will be passed by slit box 42.

Figure 8:
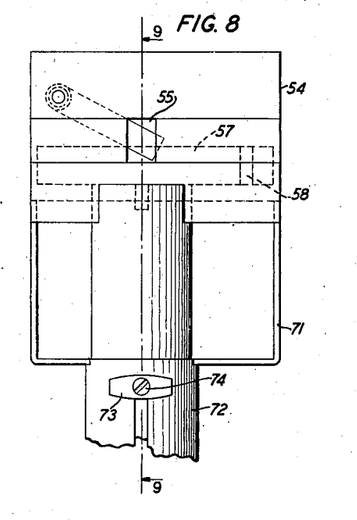
Fig. 8 is a front elevation of the crystal plate holder with the shield in lowered, or open, position, the upper portion of the shaft and sleeve assembly which supports the crystal plate holder also being shown.
Figure 9:
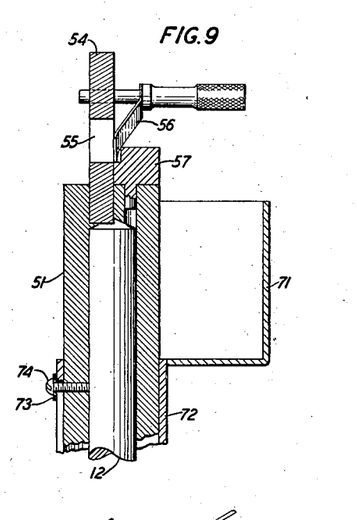
Fig. 9 is a sectional view taken on line 9—9 of Fig. 8.

Sleeve 51 is rotatably mounted on shaft 12; pointer arm 52 and cam arm 53 are mounted on, and rotatable with, sleeve 51. As shown clearly in Figs. 8 and 9, the crystal plate or specimen holder is mounted on the upper end of sleeve 51 and is rotatable therewith; the crystal plate holder includes a reference plate 54 having a centrally located aperture 55 therein. Reference plate 54 is positioned in a slot provided in the upper end of sleeve 51. A spring arm 56 is provided for holding a crystal plate being examined over the aperture. Reference plate 57 is also mounted on the upper end of sleeve 51 and may be utilized for supporting crystal plates for "edge examination." Reference plate 57 is ordinarily left in position in the crystal plate holder only at those times when it is actually to be used. When reference plate 57 is to be used, spring arm 56 and the associated operating spindle are removed from the position illustrated in Figs. 8 and 9 and placed in operative position with respect to plate 57 wherein the tip of the spindle is positioned in hole 58.

Box-like shield 71 is carried by sleeve 72; sleeve 72 is slidably mounted on sleeve 51 whereby shield 71 may be moved between a raised position (Figs. 2 and 3) wherein it is effective to intercept and block any X-rays that might pass through aperture 55 and tend to continue on in their original direction; (it should be noted, however, that the shield does not interfere with X-rays reflected towards ionization chamber 41) and a lowered position (Figs. 8 and 9) which permits ready access to the reference plates for positioning and manipulation of the crystal plate. The pressure exerted by spring plate 73, attached to sleeve 51 by screw 74, against sleeve 72 may be so adjusted as to permit desired movement of shield 71 from one position to the other and yet to normally hold the shield in its adjusted position.

One surface of the projecting end of cam arm 53, as shown particularly in Fig. 1, is normally held in contact with the tip of adjusting screw 75 by coiled spring 76, one end of the spring being attached to the under side of cam arm 53 and the other end being attached to block 77. Block 77, which is threaded to accommodate adjusting screw 75, is supported by horizontal arm 81 which, in turn, is supported by vertical bar 24. The opposite surface of the projecting end of cam arm 53 is contacted by the rounded tip of dial operating arm 82 which is held in contact therewith by a suitable biasing spring included in the dial assembly.

It will be recalled that vertical bar 24 is rotatable with lower disc 17 and it will be apparent, therefore, in view of the contact between cam arm 53 and adjusting screw 75, that rotation of disc 17 will cause rotation, not only of dial gauge 25, but also of cam arm 53; rotation of cam arm 53, in turn, results in rotation of sleeve 51 and the crystal plate holder supported thereby as well as of pointer arm 52. This rotation is indicated by pointer arm 52 in cooperation with the scale provided on disc 22.

Additional, finely adjusted, rotation of the crystal plate holder independently of the discs is achieved by movement of adjusting screw 75 as corresponding movements of cam arm 53 are caused thereby. This rotation is indicated by dial gauge 25 as operating arm 82 thereof "follows" the movements of the cam arm. The smaller pointer and scale indicate the number of complete revolutions of the larger needle, i. e., the degrees, while the larger pointer and associated scale indicate the additional part of a complete revolution, i. e., the minutes. The tip of operating arm 82 is provided with a ball-shaped contact carefully designed to rectify the tangent relationship and to give, as nearly as feasible, a linear indication on the dial.

Tapered pin 83 is provided for positioning in registering holes in the three discs and in the baseplate thereby locking the members in adjusted position.

Figure 4:
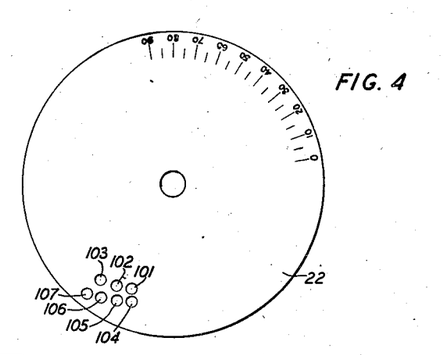
Fig. 4 is a plan view of the top disc of the assembly showing the spacing of the holes therein.

As shown in Figs. 1 and 4, seven spaced holes, 101 to 107, inclusive, are provided in disc 22. The same number of holes are provided in each of the other two discs and in the base plate; the spacing of each set of holes is different so that for a selected hole in disc 22, it will be possible to obtain registry with one, and only one, hole in each of the other discs and in base-plate 11. Each hole is very accurately located, drilled and reamed with a particular test in mind, i. e., with a certain combination of holes lined up and with pin 83 positioned therein, the ionization chamber, the slit box and the crystal plate holder will be set in the proper angular relationship for a particular test of the crystal plate, and the slit box and ionization chamber will be locked in this adjusted position. (The angular adjustment will be indicated by the position of pointer arm 52 on the scale provided on disc 22.) This angular relationship may be varied slightly by rotation of adjusting screw 75 in the desired direction which causes corresponding movement of the crystal plate holder and consequent shifting of the crystal plate under test with respect to the incident X-ray beam. The extent of this latter adjustment will be indicated by the reading of dial gauge 25.

In order to further describe the arrangement contemplated by the invention, the particular spacing of the holes in the discs which has been selected for illustration in the present instance will be described. It will be understood, of course, that the relative spacing of the holes will be varied as a different set of tests is contemplated or when different types of plates are involved.

Referring first to Fig. 4, which is a plan view of the upper disc 22, the holes of the inner row, i. e., holes 101, 102 and 103 are intended for testing positive orientation cuts AT and CT while holes 104, 105 and 106 of the outer row are intended for corresponding tests of negative orientation cut BT. Hole 107 tests any cut rotated about the X axis whether positive or negative.

Let us assume now that an AT plate (35 degrees 15 minutes) be placed in position in the crystal plate holder, being mounted vertically against reference plate 54 and held in position by spring 56. The surface of the plate that is struck by the incident X-ray beam, when the plate is so mounted, is at the center of rotation of the goniometer. Now hole 101 is intended for testing AT or CT plates by reflection from the $(05 \cdot \bar{2})$ atomic plane, the X-ray reflection angle of which is 71 degrees 42 minutes. Pin 83 is placed in hole 101 therefore and the discs are rotated with respect to each other until the pin drops on through the respectively registering holes in discs 21 and 17 and in base-plate 11. (Only one hole in each case will register.)

Now with pin 83 so positioned, the resulting adjusted position in which ionization chamber 41, slit box 42 and crystal plate holder 71 are set will be such that, when the incident beam of X-rays is projected against the AT cut being tested, maximum reflection of the X-rays will be observed (for example by use of the circuit of Fig. 10 to be described subsequently) when pointer arm 52 indicates "30 degrees" on the scale provided on disc 22 and when dial gauge 25 reads "5 degrees and 15 minutes"; i. e., the small dial will read "5", indicating five complete revolutions of the large needle or 5 degrees, while the needle will read "15" on the large dial indicating additional rotation of 15 minutes. This would indicate that the plate is a perfect, properly orientated AT cut.

It sometimes happens that a plate, while having the proper sense of orientation, is cut with a slight error, i. e., the inclination about the Z axis is either too great or too small. Such plates may still be acceptable depending upon the tolerances of the particular job and it is important that the magnitude of the error be readily determined. For example, let us assume that the AT plate referred to above were cut with an error of 10 minutes, i. e., with an inclination of 35 degrees 5 minutes with respect to the Z axis instead of the correct inclination of 35 degrees 15 minutes. In such event, when tested as above, maximum reflection would be noted when pointer 52 reads "30 degrees" and when dial 25 indicates "5 degrees and 5 minutes"; the observer would know therefore that the plate being tested was an AT cut with an error of 10 minutes and he would reject or accept the plate depending upon the tolerances for the particular job. The usual procedure in any event in carrying out a test would be to first note the reflection occurring from the locked position and to then slightly change this relative adjustment by operation of adjusting screw 75, first in one direction and then in the other, in order to determine whether an increase in reflection results from such further adjustment.

It may also sometimes happen that a plate be cut with the wrong sense of orientation, i. e., the plate being tested, while supposedly an AT cut of 35 degrees 15 minutes may actually have been a plate cut at the opposite inclination of −35 degrees 15 minutes with respect to the Z axis. Such an error is immediately detected by the arrangement of the present invention as in such event the atomic plane from which reflection of the X-rays is attempted would not be the $(05 \cdot \bar{2})$ plane as above, (a good reflecting plane) but would be the mirror image plane $(05 \cdot 2)$ which is a very poor X-ray reflecting plane. The absence of reflection, or presence thereof in only a slight amount, would indicate to the observer that the plate had been cut with the wrong sense of orientation and that it should be rejected.

The procedure with respect to a CT cut (38 degrees) would be the same as that described above in connection with the AT cut except for the difference in the "standard" angle.

Returning now for the moment to Fig. 4, hole 102 (and the registering holes in the other discs and in the base-plate) is used for testing AT or CT cuts by reflection from the $(01 \cdot \bar{1})$ atomic plane the X-ray reflection angle of which is 13 degrees 20 minutes. This test is a check on the test which utilized hole 101; the position of the plate in the crystal plate holder is not changed from that of the previous tests using hole 101 and the respective angle readings should be the same in each instance.

Hole 103 is also used for testing AT or CT cuts by reflection from the $(01 \cdot \bar{1})$ atomic plane but in this instance the plate is first rotated 90 degrees on its face in contact with reference plate 54 from its position during the preceding test.

In the previous instance of reflection from the $(01 \cdot \bar{1})$ plane the reflected beam travels in a plane normal to the axis of rotation of the goniometer and containing the incident ray (the so-called "plane of the instrument") and thus enters the ionization chamber slit at its center. In the present instance, however, wherein the plate has been rotated as described, the reflected beam is reflected downward from the "plane of the instrument" because it is reflected from atomic planes which are not normal to the plane of the instrument. However, as the vertical angle is small the reflected beam will still enter the ionization chamber slit near one end thereof. Therefore, the angle of incidence, measured from the plane of the instrument, becomes 13 degrees 35 minutes instead of 13 degrees 20 minutes as before and the position of the ionization chamber is 26 degrees 34 minutes instead of 26 degrees 40 minutes as before.

Hole 107 is used for testing AT, BT, CT or other cuts which are orientated by rotation about the X axis and utilizes the $(11 \cdot 0)$ atomic plane the X-ray reflection angle of which is 18 degrees 17 minutes. In this instance the plate being tested is so supported in the crystal plate holder on reference plate 57 that the incident X-ray beam strikes the edge of the plate.

Holes 104, 105 and 106 are used for applying similar tests to the negative cut plate BT (−49 degrees) as are applied to the positive cut plates AT and CT by holes 101, 102 and 103. That is, hole 104 is used for checking the orientation of the BT plate and for preventing acceptance of a plate of opposite sense (+49 degrees) for a perfect BT cut. The $(04 \cdot 4)$ plane is used for this test, the X-ray reflection angle of which is 67 degrees 13 minutes; the (04·4) plane is a much stronger reflector of X-rays than the mirror image plane (04·4̄). Hole 105 rechecks the reading of the previous test without changing the position of the plate in the crystal plate holder and utilizes reflection from the (02·3) atomic plane the X-ray reflection angle of which is 34 degrees 5 minutes. Hole 106 is also used for testing BT cuts by reflection from the (02·3) plane but in this instance the plate is first rotated 90 degrees on its face in contact with reference plate 54 from its position during the preceding test. The above remarks relative to change in the reflected beam during use of hole 103 apply in this instance also.

During the design of the goniometer the proper spacing of the holes in the discs may be determined, if desired, by use of standard plates, i. e., plates known to have been cut at the exact specified orientation, as guides. It will be understood, of course, that the spacing of the holes described above and the respective uses thereof have been selected for illustration only, and that the spacing will vary according to the types of plates to be tested and the particular tests to be applied.

It will be apparent that the novel arrangement contemplated by the invention makes it possible for relatively inexperienced persons to apply predetermined tests to crystal plates as it is necessary only to position the tapered pin in the proper hole in the upper disc and to register the pin in the respective holes of the other discs and the base-plate. Errors, if existent, are readily determined from the dial reading and plates cut with the wrong sense of orientation are readily detected. It should be noted that even in the cases where a change in the type of reflection is involved (use of holes 103 and 106 described above) the same simple means of setting up the adjustments merely by registering the pin in the proper holes is followed.

Figure 10:
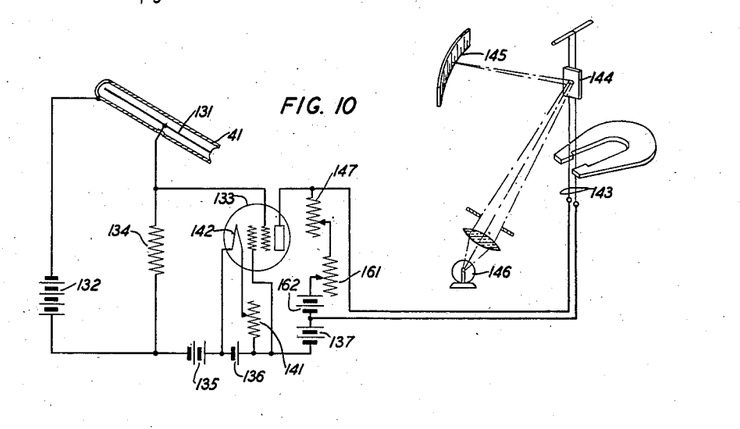
Fig. 10 is a schematic showing of a circuit that may be used with the goniometer for detecting and measuring X-ray reflection.

Referring now to Fig. 10, there is schematically illustrated a circuit that may be used in conjunction with ionization chamber 41 to indicate the intensity of reflection of X-rays by a crystal plate being tested in the goniometer of the present invention. Collector plate 131 of the ionization chamber is connected in series with battery 132 and the input resistance of vacuum tube 133; tube 133 may be of a type commonly referred to as the "General Electric Co. Pilotron F. P. 54." A relatively high resistance 134 is included in the input circuit of the vacuum tube while the usual voltage sources 135, 136 and 137 are connected in the conventional manner, rheostat 141 being provided for controlling the energization of cathode 142. The vibrating ribbon 143 of a galvanometer (shown schematically) is connected across the output of tube 133. Mirror 144, vibrated by ribbon 143, is adapted to reflect a beam of light onto scale 145, the light being projected onto the mirror from source 146. By means of rheostats 147 and 161, which are connected in series with battery 162 across the output of vacuum tube 133, the galvanometer circuit may be so regulated that normally no current will pass through ribbon 143 and the beam of light reflected by mirror 144 will be stationary on scale 145. When a reflected X-ray beam enters ionization chamber 41 and strikes collector plate 131, however, a current is produced along plate 131 and a potential is established across the input circuit of vacuum tube 133. As a result the plate resistance of the vacuum tube is changed and the output circuit is unbalanced causing a current to flow through galvanometer ribbon 143 which results in rotation of mirror 144; this, in turn, causes movement of the light beam along scale 145 thus providing indication of the intensity of the X-ray reflection by the crystal plate being tested.

While certain specific embodiments of the invention have been selected for disclosure and detailed description, the invention is not of course limited in its application to such disclosures. The disclosed embodiments should be regarded as illustrative of the invention rather than restrictive thereof.

What is claimed is:

1. X-ray analysis apparatus comprising a source of X-rays and a goniometer, said goniometer comprising a base-plate, a slit box, means for mounting said slit box on said base-plate, a vertical shaft mounted on said base-plate, a specimen holder for supporting a specimen to be analyzed, means for rotatably supporting said specimen holder on said shaft, an ionization chamber, means for rotatably supporting said ionization chamber with respect to said shaft, and means for setting said slit box, said specimen holder and said ionization chamber in any one of a plurality of adjusted positions with respect to each other.

2. X-ray analysis apparatus comprising a source of X-rays and a goniometer, said goniometer comprising a base-plate, a slit box, means for mounting said slit box on said base-plate, a vertical shaft mounted on said base-plate, a specimen holder for supporting a specimen to be analyzed, means for rotatably supporting said specimen holder on said shaft, an ionization chamber, means for rotatably supporting said ionization chamber with respect to said shaft, means for bringing said slit box, said specimen holder and said ionization chamber into any one of a plurality of adjusted positions with respect to each other and for locking said slit box and said ionization chamber in such selected position, and means for obtaining further adjustment of the position of said specimen holder with respect to the adjusted position in which said slit box and said ionization chamber are locked.

3. X-ray apparatus for testing quartz plates comprising a source of X-rays and a goniometer, said goniometer comprising a base-plate, a collimator, means for supporting said collimator from said base-plate, a vertical shaft mounted on said base-plate, a holder for supporting a quartz plate being tested, means for rotatably supporting said holder on said shaft, an ionization chamber for receiving an X-ray beam reflected from the quartz plate being tested, means for rotatably supporting said ionization chamber with respect to said shaft, means for setting said collimator, said holder and said ionization chamber in any one of a plurality of predetermined adjusted positions with respect to one another, and means for indicating the particular adjusted position assumed.

4. Apparatus for X-ray analysis of quartz piezoelectric plates comprising a source of X-rays and a goniometer, said goniometer comprising a base-plate, a slit box, means for supporting said slit box from said base-plate, a shaft mounted vertically on said base-plate, a plurality of discs rotatably mounted on said shaft, a holder for supporting a quartz plate being analyzed, means for rotatably supporting said holder on said shaft, an ionization chamber for receiving an X-ray beam reflected from the quartz plate being analyzed, means for supporting said ionization chamber by one of said discs, means supported by another of said discs effective upon rotation of the disc to cause corresponding rotation of said holder, and means for securing said discs in any one of a plurality of predetermined relative rotational positions with respect to one another and with respect to said base-plate whereby said slit box, said holder and said ionization chamber are brought into a corresponding, adjusted position with respect to one another.

5. Apparatus for X-ray analysis of quartz piezoelectric plates comprising a source of X-rays and a goniometer, said goniometer comprising a base-plate, a slit box, means for supporting said slit box from said base-plate, a shaft mounted vertically on said base-plate, a plurality of discs rotatably mounted on said shaft, a holder for supporting a quartz plate being analyzed, means for rotatably supporting said holder on said shaft, an ionization chamber for receiving an X-ray beam reflected from the quartz plate being analyzed, means for supporting said ionization chamber by one of said discs, means supported by another of said discs effective upon rotation of the disc to cause corresponding rotation of said holder, a pointer arm rotatable with said holder, a graduated scale on another of said discs, and means for securing said discs in any one of a plurality of predetermined relative rotational positions with respect to one another and with respect to said base-plate whereby said slit box, said holder and said ionization chamber are brought into a corresponding adjusted position with respect to one another, said pointer arm acting in conjunction with said scale to indicate the relative rotational positions of said holder, chamber and slit box.

6. Apparatus for X-ray analysis of piezoelectric plates comprising a source of X-rays and a goniometer, said goniometer comprising a base-plate, a slit box, means for supporting said slit box from said base-plate, a shaft mounted vertically on said base-plate, a plurality of discs rotatably and concentrically mounted on said shaft, a holder for supporting a plate being analyzed, means for rotatably supporting said holder on said shaft, means for receiving an X-ray beam reflected from the plate being analyzed, means for rotatably supporting said receiving means by one of said discs, means carried by another of said discs effective upon rotation of the disc to cause corresponding rotation of said holder, each of said discs and said base-plate having an equal number of spaced holes therein, the relative spacing of the holes in the respective discs and in the base-plate being such that for any selected hole in the uppermost of said discs one, and only one, of the holes in the other discs and the base-plate will register therewith, and means for obtaining registry with a selected hole in the uppermost disc and a respectively predetermined hole in each of the other discs and the base-plate.

7. Apparatus for X-ray analysis of quartz piezoelectric plates comprising a source of X-rays and a goniometer, said goniometer comprising a base-plate, a slit box, means for supporting said slit box from said base-plate, a shaft mounted vertically on said base-plate, a plurality of discs rotatably mounted on said shaft, a holder for supporting a quartz plate being analyzed, means for rotatably supporting said holder on said shaft, an ionization chamber for receiving an X-ray beam reflected from the quartz plate being analyzed, means for supporting said ionization chamber by one of said discs, means supported by another of said discs effective upon rotation of the disc to cause corresponding rotation of said holder, means for locking said discs in any one of a plurality of predetermined relative rotational positions with respect to one another and with respect to said base-plate whereby said slit box, said holder and said ionization chamber are brought into a corresponding adjusted position with respect to one another, and means for obtaining further movement of said holder independently of the position of said discs.

8. Apparatus for X-ray analysis of quartz piezoelectric plates comprising a source of X-rays and a goniometer, said goniometer comprising a base-plate, a slit box, means for supporting said slit box from said base-plate, a shaft mounted vertically on said base-plate, a plurality of discs rotatably mounted on said shaft, a holder for supporting a quartz plate being analyzed, means for rotatably supporting said holder on said shaft, an ionization chamber for receiving an X-ray beam reflected from the quartz plate being analyzed, means for supporting said ionization chamber by one of said discs, means supported by another of said discs effective upon rotation of the disc to cause corresponding rotation of said holder, means for locking said discs in any one of a plurality of predetermined relative rotational positions with respect to one another and with respect to said base-plate whereby said slit box, said holder and said ionization chamber are brought into a corresponding, adjusted position with respect to one another, means for indicating the relative adjusted position of said chamber, holder and slit box, means for obtaining further movement of said holder independently of the position of said discs, and means for indicating the extent of such further movement.

9. X-ray analysis apparatus comprising a source of X-rays and a goniometer, said goniometer comprising a base-plate, a slit box, means for supporting said slit box from said base-plate, a shaft mounted vertically on said base-plate, a plurality of discs rotatably and concentrically mounted on said shaft, a crystal plate holder for supporting a plate being analyzed, a sleeve rotatably supported on said shaft, means for supporting said holder on said sleeve, a cam arm carried by said sleeve, a vertical bar carried by that one of said discs which is lowermost on said shaft, a horizontal arm mounted on said bar, means effective upon rotation of said lowermost disc to cause corresponding rotation of said sleeve and said crystal plate holder, said last-mentioned means including means carried by said horizontal arm and engaging one surface of said cam arm, an ionization chamber for receiving an X-ray beam reflected from the piezoelectric plate being analyzed, means for supporting said ionization chamber from a second one of said discs, a graduated scale on the upper surface of that disc which is uppermost on said shaft, means for securing said discs in any one of a plurality of predetermined relative rotational positions with respect to one another and with respect to said base-plate whereby said slit box, said crystal plate holder and said ionization chamber are brought into a corresponding, adjusted position with respect to one another, and a pointer arm carried by said sleeve and acting in conjunction with said graduated scale.

10. X-ray analysis apparatus comprising a source of X-rays and a goniometer, said goniometer comprising a base-plate, a slit box, means for supporting said slit box from said base-plate, a shaft mounted vertically on said base-plate, a plurality of discs rotatably and concentrically mounted on said shaft, a crystal plate holder for supporting a plate being analyzed, a sleeve rotatably supported on said shaft, means for supporting said holder on said sleeve, a cam arm carried by said sleeve, a vertical bar carried by that one of said discs which is lowermost on said shaft, a horizontal arm mounted on said bar, means effective upon rotation of said lowermost disc to cause corresponding rotation of said sleeve and said crystal plate holder, said last-mentioned means including means carried by said horizontal arm and engaging one surface of said cam arm, an ionization chamber for receiving an X-ray beam reflected from the piezoelectric plate being analyzed, means for supporting said ionization chamber from a second one of said discs, a graduated scale on the upper surface of that disc which is uppermost on said shaft, means for securing said discs in any one of a plurality of predetermined relative rotational positions with respect to one another and with respect to said base-plate whereby said slit box, said crystal plate holder and said ionization chamber are brought into a corresponding, adjusted position with respect to one another, and a pointer arm carried by said sleeve and acting in conjuction with said graduated scale, said means carried by said horizontal arm and engaging one surface of said cam arm being adjustable with respect to the position of said horizontal arm for causing movement of said cam arm independently of movement of said horizontal arm whereby said crystal plate holder may be rotated independently of rotation of said discs.

11. X-ray analysis apparatus comprising a source of X-rays and a goniometer, said goniometer comprising a base-plate, a slit box, means for supporting said slit box from said base-plate, a shaft mounted vertically on said base-plate, a plurality of discs rotatably and concentrically mounted on said shaft, a crystal plate holder for supporting a plate being analyzed, a sleeve rotatably supported on said shaft, means for supporting said holder on said sleeve, a cam arm carried by said sleeve, a vertical bar carried by that one of said discs which is lowermost on said shaft, a horizontal arm mounted on said bar, means effective upon rotation of said lowermost disc to cause corresponding rotation of said sleeve and said crystal plate holder, said last-mentioned means including means carried by said horizontal arm and engaging one surface of said cam arm, an ionization chamber for receiving an X-ray beam reflected from the piezoelectric plate being analyzed, means for supporting said ionization chamber from a second one of said discs, a graduated scale on the upper surface of that disc which is uppermost on said shaft, means for securing said discs in any one of a plurality of predetermined relative rotational positions with respect to one another and with respect to said base-plate whereby said slit box, said crystal plate holder and said ionization chamber are brought into a corresponding, adjusted position with respect to one another, a pointer arm carried by said sleeve and acting in conjunction with said graduated scale, said means carried by said horizontal arm and engaging one surface of said cam arm being adjustable with respect to the position of said horizontal arm for causing movement of said cam arm independently of movement of said horizontal arm whereby said crystal plate holder may be rotated independently of rotation of said discs, a dial gauge mounted on said vertical bar, an operating arm for said dial gauge and yieldable means for normally holding an end of said operating arm in engagement with another surface of said cam arm whereby movements of said cam arm caused by said adjustable means are indicated by said dial gauge.

12. Apparatus for X-ray analysis of a specimen of crystalline material comprising a source of X-rays and a goniometer, said goniometer comprising a base-plate, a vertical shaft mounted on said base-plate, a collimator, means for supporting said collimator from said base-plate, a plurality of discs rotatably mounted on said shaft in stacked relationship, a specimen holder for supporting a specimen to be analyzed, means for rotatably supporting said specimen holder on said shaft, means mounted on the lowermost of said discs effective upon rotation thereof to cause corresponding rotation of said specimen holder, an ionization chamber for receiving an X-ray beam reflected by the specimen being analyzed, means for mounting said ionization chamber on another of said discs for rotation therewith, each of said discs and said base-plate having an equal number of spaced holes therein, the relative spacing of the holes in the respective discs and in the base-plate being such that for any selected hole in the uppermost of said discs one, and only one, of the holes in the other discs and in the base-plate will register therewith, and means for obtaining registry of any selected hole in the uppermost disc with a respectively predetermined hole in each of the other discs and in the base-plate.

13. Apparatus for X-ray analysis of quartz piezoelectric plates comprising a source of X-rays and a goniometer, said goniometer comprising a base-plate, a vertical shaft mounted on said base-plate, a collimator, means for supporting said collimator from said base-plate, a plurality of discs rotatably mounted on said shaft in stacked relationship, a plate holder for supporting a plate being analyzed, means for rotatably supporting said plate holder on said shaft, a pointer arm mounted on said shaft and rotatable with said plate holder, means mounted on the lowermost of said discs effective upon rotation thereof to cause corresponding rotation of said plate holder and said pointer arm, means for receiving an X-ray beam reflected from the piezoelectric plate being analyzed, means for mounting said receiving means on another of said discs for rotation therewith, a graduated scale on the upper surface of the uppermost of said discs, each of said discs and said base-plate having an equal number of spaced holes therein, the relative spacing of the holes in the respective discs and in the base plate being such that for any selected hole in the uppermost of said discs one, and only one, of the holes in the other discs and in the base-plate will register therewith, and means for obtaining registry of any selected hole in the uppermost disc with a predetermined hole in each of the other discs and in the base-plate whereby a predetermined rotational positioning of the discs with respect to each other and to the base-plate and a corresponding relative positioning of the collimator, plate holder and receiving means are attained, said pointer arm acting in conjunction with said graduated scale to indicate the relative positioning established.

14. Apparatus for X-ray analysis of quartz piezoelectric plates comprising a source of X-rays and a goniometer, said goniometer comprising a base-plate, a vertical shaft mounted on said base-plate, a collimator, means for supporting said collimator from said base-plate, a plurality of discs rotatably mounted on said shaft in stacked relationship, a plate holder for supporting a plate being analyzed, means for rotatably supporting said plate holder on said shaft, a pointer arm mounted on said shaft and rotatable with said plate holder, means mounted on the lowermost of said discs effective upon rotation thereof to cause corresponding rotation of said plate holder and said pointer arm, means for receiving an X-ray beam reflected from the piezoelectric plate being analyzed, means for mounting said receiving means on another of said discs for rotation therewith, a graduated scale on the upper surface of the uppermost of said discs, each of said discs and said base-plate having an equal number of spaced holes therein, the relative spacing of the holes in the respective discs and in the base-plate being such that for any selected hole in the uppermost of said discs one, and only one, of the holes in the other discs and in the base-plate will register therewith, means for obtaining registry of any selected hole in the uppermost disc with a predetermined hole in each of the other discs and in the base-plate whereby a predetermined rotational positioning of the discs with respect to each other and to the base-plate and a corresponding relative positioning of the collimator, plate holder and receiving means are attained, means for causing additional rotation of said plate holder independently of rotation of said discs, and means for indicating the extent of such additional rotation.

15. Apparatus for analysis of a quartz piezoelectric plate by X-rays comprising a source of X-rays and a goniometer, said goniometer comprising a slit box, a base-plate, means for mounting said slit box on said base-plate, a plate holder for supporting a piezoelectric plate for analysis, an ionization chamber for receiving X-rays reflected from the plate being analyzed, means rotatable with respect to each other and with respect to said base-plate for controlling the rotation of said ionization chamber and said plate holder and means for locking said rotation controlling means in any one of a plurality of predetermined relative rotational positions with respect to each other and to said base-plate, said locking means being effective only for said predetermined relative rotational positions.

16. Apparatus for X-ray analysis of quartz piezoelectric plates comprising a source of X-rays and a goniometer, said goniometer comprising a collimator, a base-plate, means for supporting said collimator from said base-plate, a holder for supporting a piezoelectric plate being analyzed in the path of X-rays projected from the X-ray source, a metal plate having an aperture therein mounted in said holder for supporting a piezoelectric plate being analyzed in such a position that the projected X-rays strike one major surface of the piezoelectric plate, a second metal plate removably mounted in said holder for supporting a piezoelectric plate being analyzed in such a position that the projected X-rays strike one edge surface of the piezoelectric plate, a shield movably mounted on said holder, said shield being so positioned that it is effective to block X-rays passing through a piezoelectric plate mounted in said holder but ineffective with respect to the X-rays reflected from the piezoelectric plate, means for rotatably supporting said holder with respect to said base-plate, an ionization chamber for receiving X-rays reflected from the piezoelectric plate being analyzed, means for rotatably supporting said ionization chamber with respect to said base-plate, and means for bringing said collimator, said ionization chamber and said holder into any one of a predetermined relative rotational posiitons with respect to each other and to said base plate.

WALTER L. BOND.